(12) United States Patent
Yao (10) Patent No.: US 10,848,815 B2
(45) Date of Patent: Nov. 24, 2020

(54) OUTPUTTING A MESSAGE DURING DOWNLOADING OR BUFFERING

(71) Applicant: DISH Network L.L.C., Englewood, CO (US)

(72) Inventor: Kevin Yao, Cheyenne, WY (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/110,784

(22) Filed: Aug. 23, 2018

(65) Prior Publication Data

US 2020/0068249 A1 Feb. 27, 2020

(51) Int. Cl.
| | |
|---|---|
| *H04N 21/431* | (2011.01) |
| *H04N 21/435* | (2011.01) |
| *H04N 21/443* | (2011.01) |
| *H04N 21/433* | (2011.01) |
| *H04N 21/44* | (2011.01) |

(52) U.S. Cl.
CPC ....... *H04N 21/4316* (2013.01); *H04N 21/433* (2013.01); *H04N 21/435* (2013.01); *H04N 21/44004* (2013.01); *H04N 21/4436* (2013.01)

(58) Field of Classification Search
None
See application file for complete search history.

(56) References Cited

U.S. PATENT DOCUMENTS

| | | | |
|---|---|---|---|
| 6,198,479 B1 * | 3/2001 | Humpleman | H04L 12/2803 348/E5.006 |
| 6,323,782 B1 | 11/2001 | Stephens et al. | |
| 6,411,891 B1 * | 6/2002 | Jones | G06Q 10/08 342/357.395 |
| 7,078,877 B2 | 7/2006 | Salasoo et al. | |
| 7,576,545 B2 | 8/2009 | Singh et al. | |
| 7,714,736 B2 | 5/2010 | Gielniak | |
| 7,741,849 B2 | 6/2010 | Frey et al. | |
| 9,876,693 B1 * | 1/2018 | Davidson | H04L 51/04 |
| 2002/0124252 A1 | 9/2002 | Schaefer et al. | |
| 2004/0243479 A1 * | 12/2004 | Gross | G06Q 30/02 705/26.25 |
| 2004/0268400 A1 | 12/2004 | Barde et al. | |
| 2006/0080702 A1 | 4/2006 | Diez et al. | |
| 2007/0192486 A1 * | 8/2007 | Wilson | H04N 7/163 709/225 |
| 2008/0109823 A1 * | 5/2008 | Whitfield | G06F 9/445 719/318 |
| 2009/0249428 A1 * | 10/2009 | White | H04L 12/2832 725/133 |
| 2010/0211972 A1 * | 8/2010 | Howarter | H04H 20/106 725/33 |
| 2010/0235536 A1 * | 9/2010 | Price | H04L 29/06027 709/231 |

(Continued)

FOREIGN PATENT DOCUMENTS

KR  20000028152 A  5/2000

*Primary Examiner* — Alexander Q Huerta (74) *Attorney, Agent, or Firm* — Kilpatrick Townsend & Stockton LLP (57) ABSTRACT

A media delivery system that provides media content to a user device and a method of using the system. The method may include: downloading or buffering, from a content server, a media unit to a user device; and concurrently outputting a local-automation message or a package delivery message in response to the downloading or buffering.

12 Claims, 5 Drawing Sheets

(56) References Cited

U.S. PATENT DOCUMENTS

| | | | |
|---|---|---|---|
| 2010/0290386 A1* | 11/2010 | Cabral Hinojosa | .......................... H04B 7/15557 370/315 |
| 2011/0211584 A1* | 9/2011 | Mahmoud | ........... H04L 12/2838 370/401 |
| 2012/0291068 A1* | 11/2012 | Khushoo | ............... H04L 12/282 725/38 |
| 2013/0125177 A1* | 5/2013 | Pino | .................... H04L 12/2818 725/80 |
| 2013/0145393 A1 | 6/2013 | Gold-Gavriely | |
| 2015/0215250 A1* | 7/2015 | Dinka | ................. H04L 65/1089 709/206 |
| 2016/0212495 A1* | 7/2016 | Chang | ............. H04N 21/44008 |
| 2017/0191693 A1* | 7/2017 | Bruhn | .................... G05B 15/02 |

\* cited by examiner

OUTPUTTING A MESSAGE DURING DOWNLOADING OR BUFFERING

BACKGROUND

When streaming multimedia content, e.g., television programming, to user devices, a backend computer such as a content server transmits data to the user device. The user device receives at least a portion the multimedia content via a communication network from the content server prior to outputting the content. If the content is not already available on the user device, the device may first download or buffer at least a portion of the content prior to outputting the content. Waiting for downloading or buffering the content is typically an inconvenient experience for a user of the device.

DETAILED DESCRIPTION

According to one example, a media delivery system is disclosed, as well as a method of using the system. According to one example, the method includes: downloading or buffering, from a content server, a media unit to a user device; and concurrently outputting a local-automation message or a package delivery message in response to the downloading or buffering.

According to one example, the method further includes: receiving the respective message during an outputting of a previously-downloaded or previously-buffered media unit; and storing the respective message in memory until the downloading or buffering occurs.

According to one example, the user device is a set top box (STB) computer and the method further includes: storing the respective message in the memory of the STB computer; executing the downloading or buffering at the STB computer; and outputting the respective message to a display.

According to one example, the respective message is the package delivery message, and the method further includes: receiving the package delivery message from a package delivery server.

According to one example, the respective message is the local-automation message, and the method further includes: receiving the local-automation message from a local-automation system within a local area network that also comprises the STB computer.

According to one example, the method further includes: in response to outputting the respective message, transmitting a user instruction from the STB computer to one of a package delivery server or a local-automation system.

According to one example, the user device is a mobile device computer, and the method further includes: storing the respective message in the memory of the mobile device computer; executing the downloading or buffering at the mobile device computer; and outputting the respective message via the mobile device computer.

According to one example, the respective message is the package delivery message, and the method further includes: receiving the package delivery message from a package delivery server.

According to one example, the respective message is the local-automation message, and the method further includes: receiving the local-automation message from a local-automation system.

According to one example, the local-automation message is sent from a lighting control device, an appliance control device, a security control device, an environmental control device, or an entertainment control device.

According to one example, the method further includes: in response to outputting the respective message, transmitting a user instruction from the mobile device computer to one of a package delivery server or a local-automation system.

According to one example, the user instruction instructs the local-automation system to exit a low power mode.

According to another example of the media delivery system, a method includes: outputting a first media unit via a user device; while outputting, receiving a local-automation message or a package delivery message at the user device; following the outputting of the first media unit, downloading or buffering a second media unit at the user device, from a content server; and based on the downloading or buffering, concurrently outputting the respective message while downloading or buffering.

According to one example, the user device is a set top box (STB) computer or a mobile device computer.

According to one example, the respective message is the package delivery message, and the method further includes: receiving the package delivery message from a package delivery server.

According to one example, the respective message is the local-automation message, and the method further includes: receiving the local-automation message from a local-automation system.

According to one example, the method further includes: in response to outputting the respective message: receiving at the user device a user instruction; and transmitting the user instruction to one of a package delivery server or a local-automation system.

According to one example, the local-automation message is sent from a lighting control device, an appliance control device, a security control device, an environmental control device, or an entertainment control device.

According to another example of the media delivery system, a method includes: outputting a first plurality of media units via a user device; while outputting the first plurality, receiving a local-automation message or a package delivery message at the user device; following the outputting of the first plurality, downloading or buffering, from a content server, a second plurality of media units at the user device; during the downloading or buffering experiencing an interruption wherein audio and/or video data is not presented to a user; and during the interruption, outputting the respective message.

According to one example, the method further includes: in response to outputting the respective message: receiving at the user device a user instruction; and transmitting the user instruction to one of a package delivery server or a local-automation system.

Further disclosed is a computing device programmed to execute the any of the above method steps.

Yet further disclosed is a computer program product comprising a computer readable medium storing instructions executable by a computer processor, to execute the any of the above method steps.

Any of the method examples above may be combined with one another in any suitable manner.

Media content (e.g., television shows, movies, sporting events, etc.) can be downloaded or buffered, from a content server. While a user awaits the content to download or buffer, a message—which may be unrelated to the media content, the downloading or buffering, or even the media viewing equipment—can be delivered to the user. The message can be displayed on a screen which the user anticipates viewing the media content, and the display of the message may be triggered by the downloading or buffering—e.g., displayed on a mobile device screen, a television (TV) screen, or the like. Non-limiting examples of such a message may include a local-automation message (e.g., from a residential-network device), a package-delivery message (e.g., from a third-party delivery service), or the like. Thus, by providing the message during the downloading or the buffering of the media content to a user device (e.g., such as a set top box computer or a mobile device computer), the user may make more effective use of his/her time by reading and/or acting upon the message, rather than by merely waiting the buffering or downloading to be completed.

Figure 1:
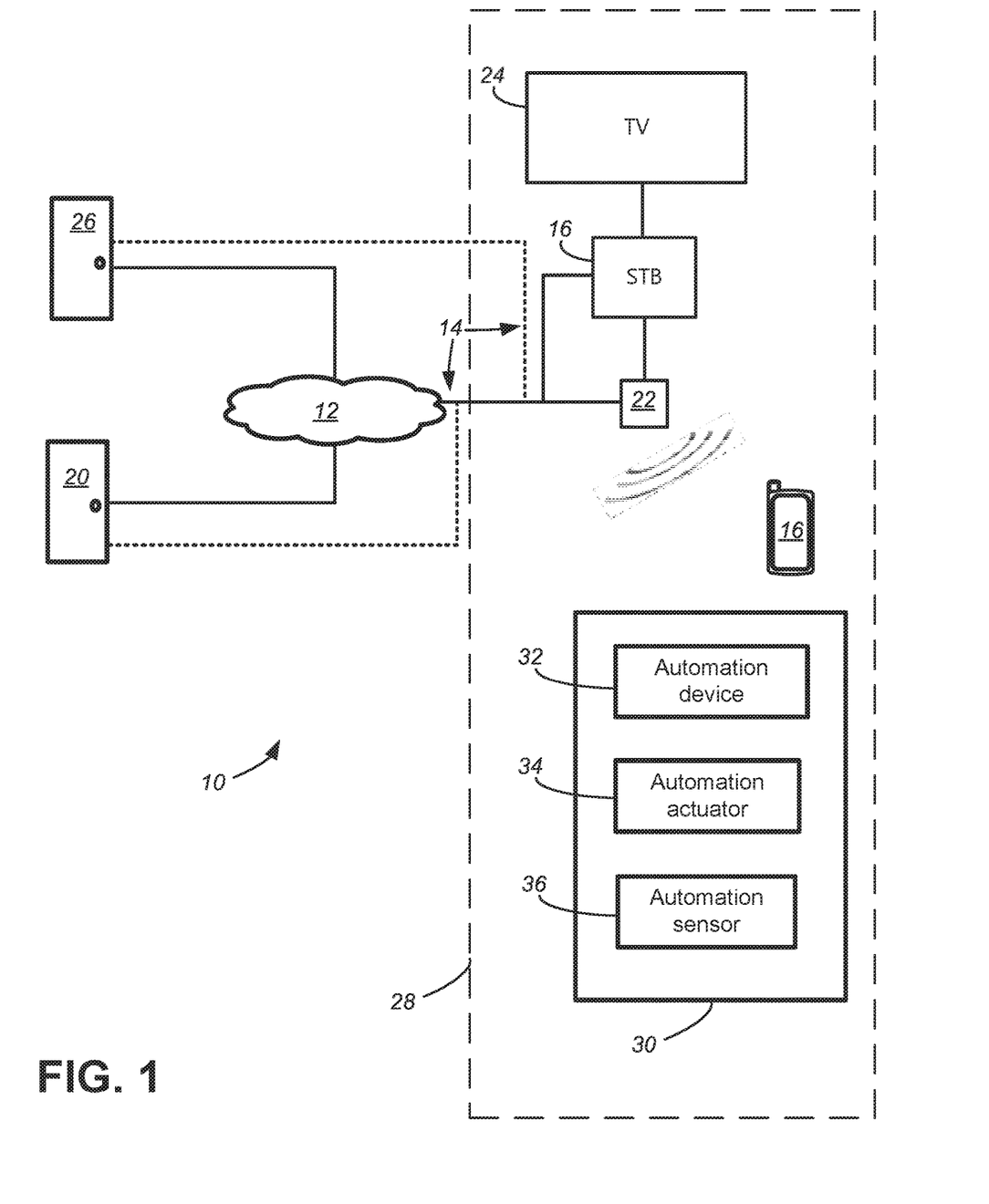
FIG. 1 shows an example media delivery system.

Turning now to FIG. 1, a media delivery system 10 is shown that facilitates the message delivery technique described above. The system 10 includes a satellite communication system 12, a wired and/or wireless communication system 14, and a user device 16 (e.g., a set top box computer or a mobile device computer), a content server 20, a modem 22, a local area network (LAN 28), and/or a local-automation system 30. It should be appreciated that examples exist that have more than one user device; e.g., typically, thousands or millions of user devices are utilized, being spread across a wide geographic region. By way of example in the present disclosure, user device 16 receives audio and/or visual media content via satellite communication system 12, via wired and/or wireless communication system 14, via a combination thereof, or the like. As described more below, each user device 16 may execute a process to control the manner in which media content is delivered, respectively, to them. As explained below, media content may be delivered, from the content server 20 to the user device 16, via the satellite communication system 12, via the wired and/or wireless communication system 14, via a combination thereof, or the like.

As used herein, a content server 20 is one or more computers programmed to store and deliver media content to devices such as user device 16. Content server 20 may provide scheduled programming, on-demand streaming, or the like. For example, server 20 may receive an identifier (representing requested media content) from user device, and in response, server 20 may execute an algorithm to transmit the requested media content to the user device. As explained more below, content server 20 may utilize satellite communication system 12, wired and/or wireless communication system 14, or both to deliver the media content.

As used herein, a media content is audio and/or visual data that is electronically-broadcasted from content server 20 to a plurality of user devices 16. Each media content may be live or pre-recorded. Each media content may have a predetermined duration (e.g., such as radio or television series, movies, news, documentaries, etc.), or each media content may have an estimated or otherwise indeterminate length (e.g., such as a sporting event, news, etc.).

Each media content includes a plurality of media units. As used herein, a media unit is a portion (e.g., also known as a segment) of a media content, and as used herein, a media unit includes: (i) one or more frames; (ii) one or more data packets; (iii) one or more other units of multimedia data; or (iv) a combination thereof. Audio or video frames can be associated with audio and/or video data; such frames are known in the art and will not be described in greater detail below. Data packets may be transmitted over a TCP/IP or like network; data packets are also known in the art. Other units of multimedia data include units suitable for wired and/or wireless long-range communication.

In one example, a media unit is a single frame of a media content which comprises potentially millions of video frames (e.g., one frame of a TV show). In another example, a media unit may be a specified number, e.g., 60, of frames of the TV show. In another example, the media unit may be defined as a specified length of a media content—e.g., 1 second of a TV show.

Turning now to the satellite communication system 12, the system 12 may comprise a constellation of satellites, and a satellite gateway that includes a transceiver. Satellites may comprise any suitable quantity of orbiting devices. Satellite may be any suitable satellite communication equipment located in earth's orbit—non-limiting examples include: communications satellites, observation satellites, navigation satellites, weather satellites, space telescopes, etc. Non-limiting examples of earth orbits include: geocentric orbits, heliocentric orbits, areocentric orbits, low earth orbits (LEO), medium earth orbits (MEO), geosynchronous orbits (GEO), high earth orbits (HEO), etc. Other orbits or orbit classifications also exist and are known to skilled artisans.

According to one example, the wired and/or wireless communication system 14 shown in FIG. 1 may comprise a land communication network and/or a wireless communication network. For example, communication system 14 may include any wired network enabling connectivity to public switched telephone network (PSTN) such as that used to provide hardwired telephony, packet-switched data communications, internet infrastructure, and the like. The communication system 14 may be coupled to the content server 20, to other computers or servers (not shown), and/or to a plurality of wired and/or wireless modems (such as modem 22, discussed below). Additionally, or alternatively, communication system 14 may include any suitable infrastructure facilitating cellular communication, including but not limited to, infrastructure configured for LTE, GSM, CDMA, etc. communication. For example, the communication system 14 may comprise a plurality of eNodeB(s), serving and gateway nodes, location registers, etc. (each of which are not shown)—e.g., according to known wireless network infrastructure and telecommunication techniques. Other aspects of land and/or wireless communication system 14 also will be appreciated by skilled artisans.

Thus, content server 20 may provide media content to the user device 16 using the satellite communication system 12, using the wired and/or wireless communication system 14, or using both. In FIG. 1, although not required, the user device 16 is shown as part of a local area network 28. The user device 16 will be described below; afterwhich, other exemplary aspects of the LAN 28 will be described.

As used herein, a user device 16 is one of a set top box computer or a mobile device computer. As used herein, a set top box computer is a computing device programmed to receive media content from content server 20 based on an authorization from the content server 20. Further, as used herein, a set top box computer is pass-through hardware; i.e., it: receives media content from the content server 20; in some instances, decodes it; in some instances, decompresses or otherwise converts the media content to a different format; and ultimately, outputs the media content as audio and/or video data via a channel. The outputted audio and/or video data may be received by a television set, a monitor, or the like and thereby displayed. As used herein, outputting audio and/or video data via a channel means providing an electronic signal (that comprises the audio and/or video data) at a hardware connection (e.g., connector, antenna, etc.) so that, when an audio system or display is connected to the hardware connection, the electronic signal may be communicated between devices and presented to the user. As used herein, presenting audio and/or video data means transducing an electronic signal (that comprises the audio and/or video data) into mechanical energy (e.g., soundwaves), transducing the electronic signal into light energy (e.g., via a display), or a combination thereof.

As used herein, a mobile device computer is a computing device programmed to receive media content from content server 20 based on an authorization from the content server 20. Further, as used herein, a mobile device computer either comprises an integral display and/or audio system, or is pass-through hardware (e.g., to another device that comprises a display and/or audio system). Thus, the mobile device computer is an electronic device capable of: receiving media content from the content server 20; in some instances, decoding the media content; in some instances, decompressing or otherwise converting the media content into a different format; and then: outputting the media content as audio and/or video data via a channel, presenting the audio and/or video data (using a display and/or audio system), or executing a combination thereof. Non-limiting examples of a mobile device computer include a Smart phone, a laptop, a tablet computer, netbook computer, a handled device, a desktop computer, and a vehicle infotainment unit, and the like.

Figure 2:
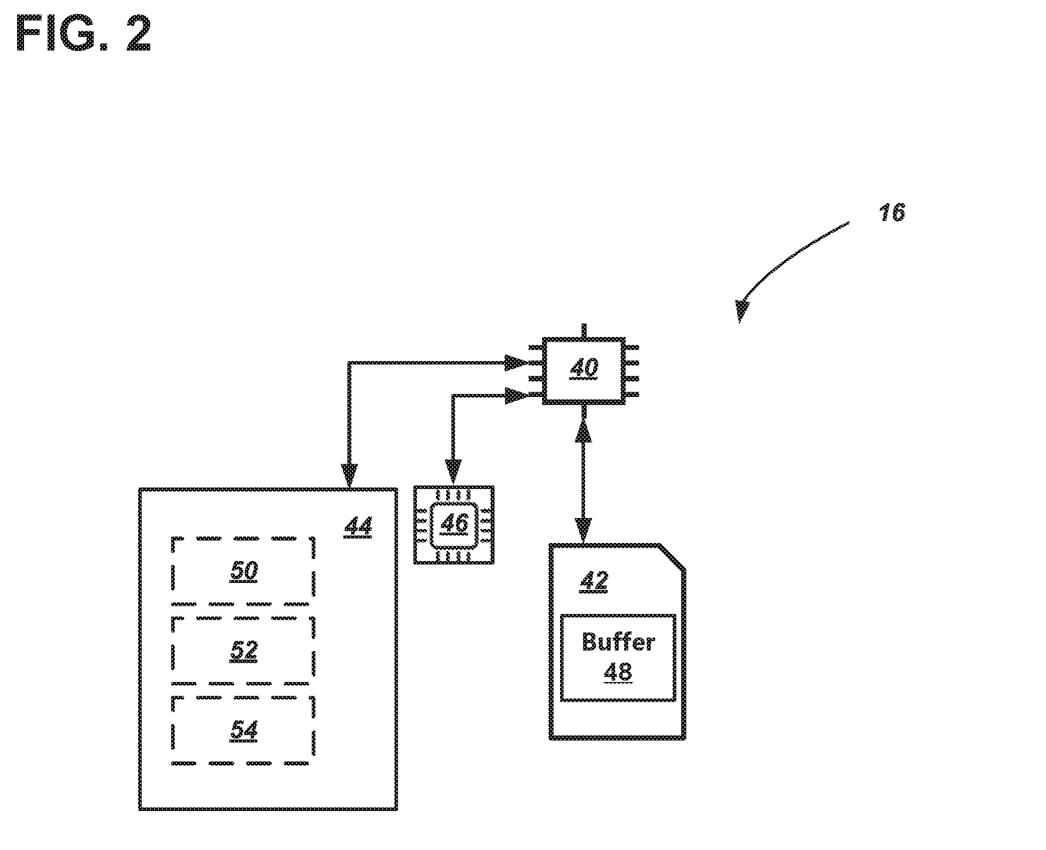
FIG. 2 shows exemplary components of a set-top-box (STB) computer or a mobile device computer.

FIG. 2 illustrates an example of user device 16, wherein the user device comprises at least one processor 40, a memory 42, an interface 44, and a decoder 46. Processor(s) 40 may comprise one or more devices capable of processing electronic instructions—non-limiting examples of processor(s) 40 include: a microprocessor, a microcontroller or controller, an application specific integrated circuit (ASIC), a field-programmable logic array (FPGA), etc.—just to name a few. As will be apparent from the description which follows, processor 40 may be programmed to carry out at least a portion of the method described herein. For example, processor(s) 40 can be configured to execute digitally-stored instructions which may be stored in memory 42 which include, among other things: buffering or downloading media content from content server 20 and concurrently providing a message to a user of user device 16 based on the buffering or downloading.

The memory 42 may include any non-transitory computer usable or readable medium, which may include one or more storage devices or articles. Exemplary non-transitory computer usable storage devices include conventional computer system RAM (random-access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 42 may store one or more computer program products which may be embodied as software, firmware, or the like; however, instructions stored therein may be unique to user device 16 and functions thereof.

Memory 42 may comprise at least one buffer 48. Buffer 48 comprises a region of memory 42 that facilitates temporary storage of audio and/or video data during media content streaming. For example, buffer 48 may be specified as a specified address range (fixed allocation) of the memory 42 or a variable address range (dynamic allocation) of the memory 42. Accordingly, buffering—as used herein—means using the buffer 48 to store temporarily one or more media units (e.g., typically, buffered audio and/or video data is stored for less than a few minutes). As will be explained more below, processor 40 may buffer media content by determining that at least a specified number of media units, e.g., at least 60 frames, are received and at least temporarily available (in the buffer 48) for outputting. Additionally, as explained more below, processor 40 may determine to interrupt or pause outputting of the media content upon determining that less than a minimum number of media units are available in the buffer 48, e.g., only one frame (to be outputted) is stored in buffer 48. Thus, buffering may include receiving and storing media units in buffer 48 while concurrently outputting some of the previously-stored media units so that the user can be presented audio and/or video data in an orderly and cohesive manner. And further, it should be appreciated that buffering may be an iterative process.

As also explained below, additionally or alternatively to buffering, processor 40 may store downloaded media content (e.g., an entire movie) in memory 42 (e.g., in ROM—e.g., this storage typically occurs for hours, days, even years). As used herein, downloading a media content means receiving the media content from the content server 20 and storing all media units of the respective media content in memory 42 before presenting it to the user.

Input/output (I/O) interface 44 is any suitable electrical or electro-mechanical device that facilitates providing user input to the user device 16 and/or facilitates providing processed information from the user device 16 to the user thereof. According to one example, interface 44 comprises a video display 50, an audio system 52 (that includes a loudspeaker), or a combination thereof. In some examples, display 50 may include input and output functionality (e.g., such as a touch screen display). The interface 44 further may comprise pushbuttons or the like which may be enable a user to select one or more user device functions, to input (to device 16) one or more instructions, etc.

I/O interface 44 further may comprise one or more ports 54 by which processed audio and/or video data may be made available. In one example, port 54 comprises a connector for providing outputted audio and/or video data to a display (or audio system) external to user device 16. In another example, port 54 comprises an antenna and/or wireless chipset for wireless providing audio and/or video data to an external display or audio system. In at least one example, port 54 may enable cellular communication (e.g., via LTE, CDMA, GSM, or the like), short-range wireless communication (e.g., WiFi, WiFi Direct, Bluetooth, Bluetooth Low Energy (BLE), etc.), and/or satellite communication. I/O interface 44 may comprise one or any suitable combination of the features described above.

As used herein, decoder 46 is an electronic device that, upon executing software instructions, decompresses and/or decodes audio data, video data, meta-data, or a combination thereof (which data initially was compressed and transmitted by content server 20). In at least some examples, the decoder 46 comprises at least a portion of processor 40. Decoder 46 may comprise one or more decompression algorithms, embodied as software instructions, and such decompression algorithms (and techniques for the use thereof) are generally known in the art.

As described above, user device 16 may be part of local area network (LAN) 28; however, LAN 28 may comprise other elements. According to one example, LAN 28 includes modem 22, TV 24, and a local-automation system 30. Each will be discussed below. As used herein, a local area network is a wired and/or wireless network of two or more computing devices (e.g., such as user device 16, modem 22, TV 24, local-automation system 30, and/or other suitable devices), wherein each of the computing devices are located within a predefined geographic region (e.g., a property address, multiple property addresses owned by a common entity, a property lot, etc.). In at least one example, the LAN 28 (and elements thereof) comprise a residential LAN, a commercial LAN, an industrial LAN, a mobile device LAN, or a vehicle LAN. An exemplary description of LAN 28 follows.

As used herein, modem 22 is a modulator-demodulator device; i.e., it is an electronics device which is capable of transmitting and receiving data over, for example, telephone or cable lines. In some instances, modem 22 further may comprise a wireless router and may transmit data wirelessly (e.g., via WiFi). Of course, wired implementations additionally or alternatively may be used as well. Modems are generally known in the art; therefore, modem 22 will not be described further here.

Television (TV) 24 is any telecommunication medium suitable for communicating video data (such as moving and/or static images in monochrome or color), as well as communicating audio data. Thus, TV 24 comprises conventional television sets, as well as any other suitable computer monitor or other display device.

As used herein, a local-automation system 30 is a system that uses computer control to monitor an environment of and/or control devices within the LAN 28. For example, as will be described more below, user device 16—via LAN 28—remotely may control a device of the system 30. This remote control may be programmed to occur in response to user device 16 sending an instruction—e.g., occurring immediately or at some later, predetermined time. Non-limiting examples of local-automation system 30 include a residential, commercial or industrial automation system, a security and monitoring system, an appliances system, a commercial building automation, etc. Local-automation system 30 may include one or more automation devices 32, one or more automation actuators 34, and one or more automation sensors 36.

Automation device 32 is a computing device within the LAN 28 that comprises memory storing instructions and a processor that execute the respective instructions. The instructions may facilitate a security function, an automated process, monitoring, data collection, or the like—e.g., within the residential, commercial, industrial, and/or vehicle environment. Non-limiting examples include a thermostat and a security touchpad.

In some examples, automation device 32 may comprise wired or wireless communication equipment to facilitate a gateway communication operation between the automation actuator(s) 34, the sensor(s) 36, and/or the user device 16. For example, automation device 32 may be programmed to communicate via ZigBee or any other suitable communication protocol.

Automation actuator 34 may be an electrical and/or electromechanical system that executes instructions received from the automation device 32. Non-limiting examples of the automation actuator 34 include a heater, a cooler, an electric motor, a light, a solenoid valve, a siren, a loudspeaker, etc.

Automation sensor 36 may include an electric and/or electronic system that collects from an environment around the sensor 36 and provides that data to the automation device 32. Non-limiting examples of the automation sensor 36 include a temperature sensor, an air pressure sensor, a camera sensor, a motion sensor, a light-intensity sensor, etc.

In some examples of local-automation system 30, the automation device 32, the automation actuator 34, and the automation sensor 36 may be located in a single housing. In other examples, these elements may be located remotely from one another.

For purposes of illustration only, and not intending to limit the scope of the local-automation system 30, consider an example of automation device 32 that is programmed to monitor a room temperature and to generate a message to the user device 16 upon detecting a triggering event. For example, the triggering event may include determining that the monitored temperature exceeds a specified threshold, e.g., 30 degrees Celsius.

According to another example of the local-automation system 30, consider an example of automation device 32 that is programmed to generate a message that includes a change of a control status. For example, the change of control status may include determining a predetermined condition is reached, the predetermined condition is not reached, that the system 30 is malfunctioning, etc.

According to another example of the local-automation system 30, consider an example of automation device 32 that is programmed to receive user input. For example, the user input may include receiving a temperature setting for a room and actuating the actuator 34 based on the setting and temperature data received from the sensor 36.

According to another example of the local-automation system 30, consider an example of automation device 32 that is programmed to receive configuration data associated with an automation process. For example, the configuration data may include data that specifies an operation such as turning on one or more lights within the user's residence when the user enters a room, turning off the lights when the user is away (e.g., at a certain time of day), actuating a loudspeaker in response to detecting an intruder, or any combination thereof.

It should be appreciated that these are provided herein merely to illustrate how local-automation system 30 may be operated. Other processes may be carried out by other illustrative systems 30. Further, any of the afore-mentioned examples may be used in combination with one another.

Figure 3A:
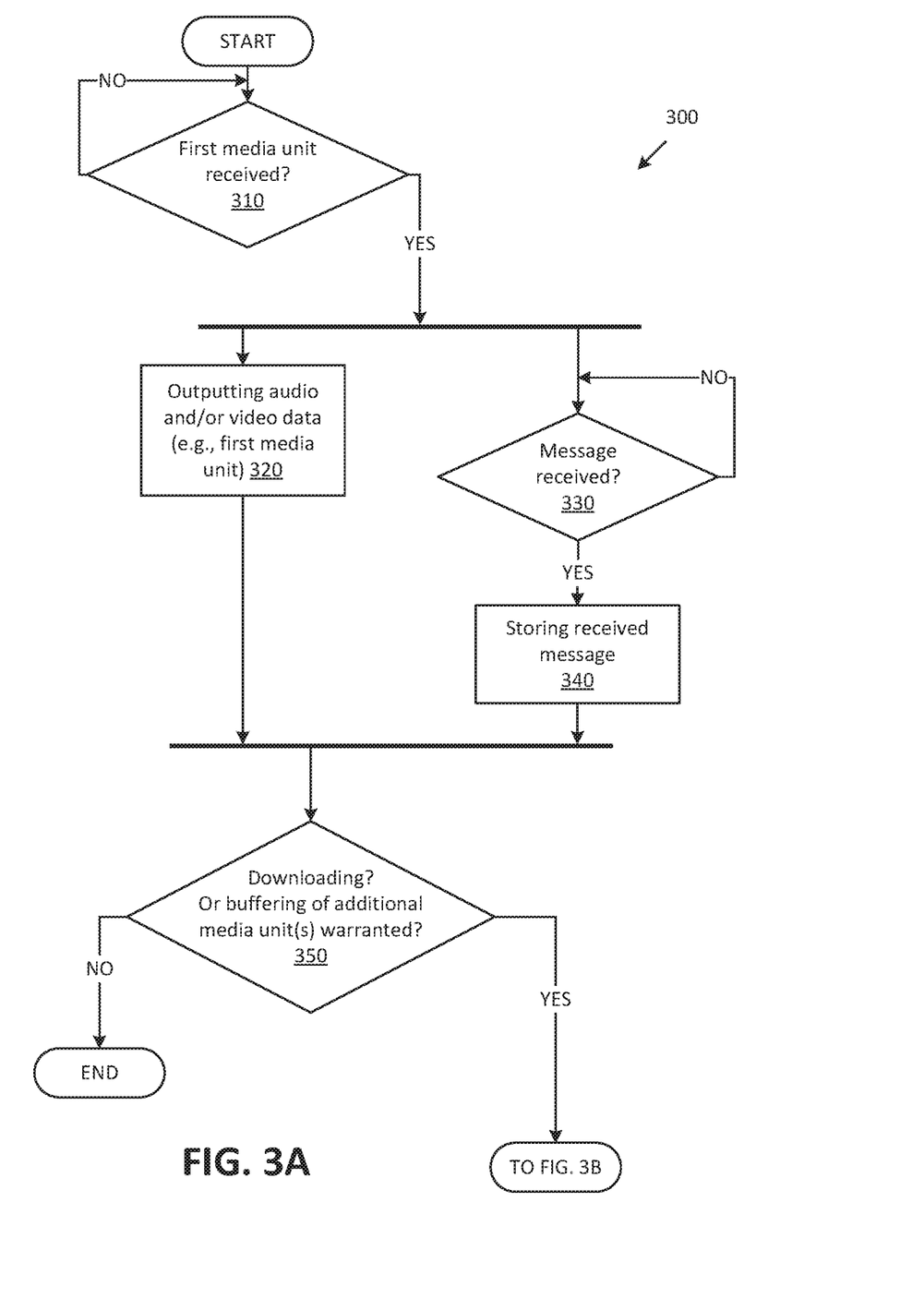
FIGS. 3A-3B are a flowchart of an exemplary process for delivering media content to the STB or mobile device computer.
Figure 3B:
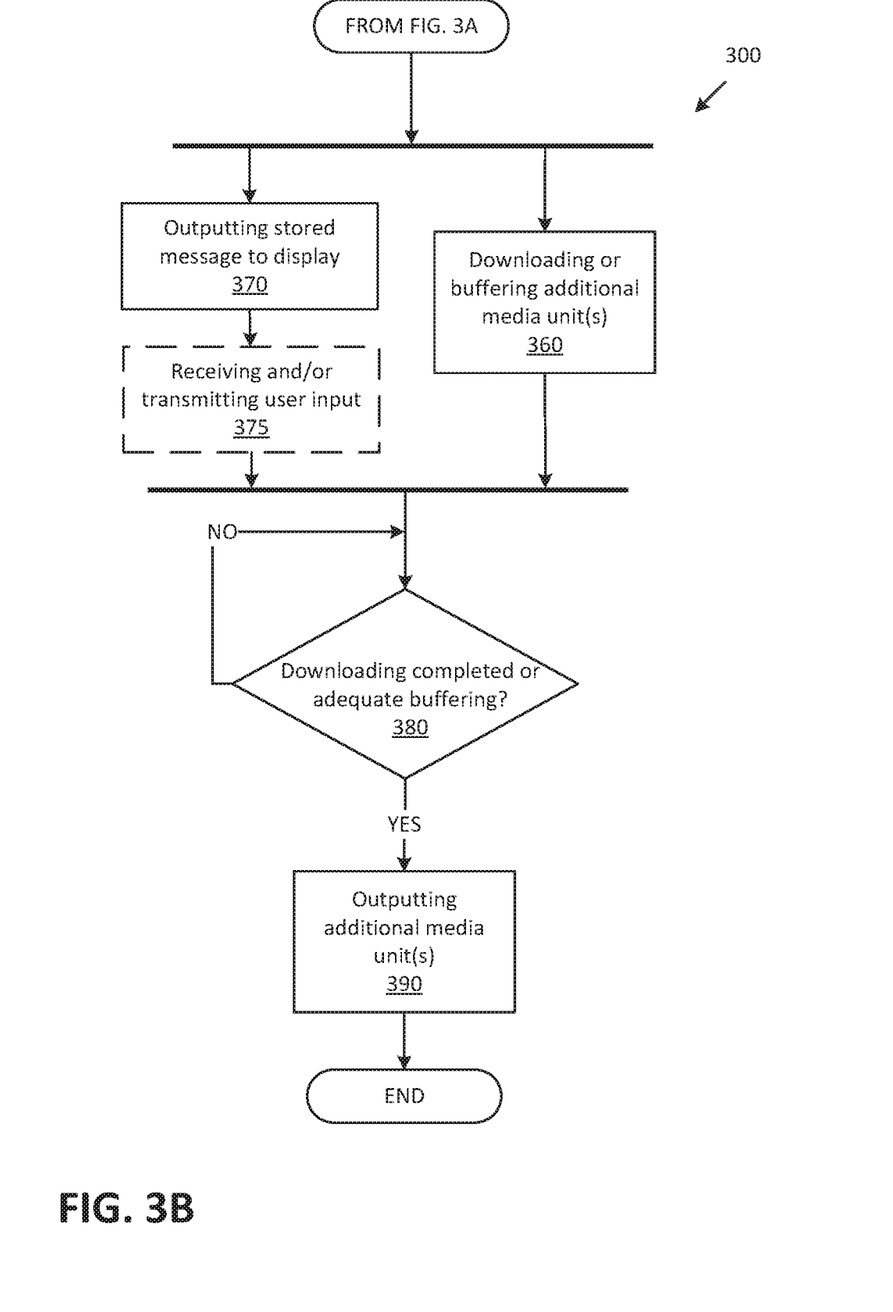

Turning now to FIGS. 3A-3B, an example process 300 for delivering media content to user device 16 is shown. With respect to FIGS. 3A-3B, various example operations are discussed below.

In one example, the user device 16 may be programmed to execute blocks of the process 300. With reference to FIG. 3A, the process 300 begins in a decision block 310, in which the user device 16 determines whether a first media unit is received. For example, the user device 16 may be programmed to receive the first media unit, e.g., one or more video frames of a TV show, from the content server 20. In one example, the user device 16 may be programmed to determine that the first media unit is received upon determining that at least a minimum specified number, e.g., 60, of media units are received and stored in memory buffer 48. If the user device 16 determines that the first media unit is received, then the process 300 may proceed to blocks 320, 330 concurrently; otherwise the process 300 returns to the decision block 310. In the present context, "concurrently" means performed at least partially in parallel. Processor 40 may concurrently execute the blocks 320, 330, e.g.: (i) by dividing a processing bandwidth of the processor 40 between block 320, 330, e.g., iteratively executing each of blocks 320, 330 for 10 milliseconds (ms), or (ii), when the processor 40 is a multicore processor, by executing the block 320 on a first core of the processor 40 and executing the block 330 on a second core of the processor 40. These are merely examples; other concurrent processing operations are also contemplated.

In the block 320, the user device 16 outputs audio and/or video data (the media content comprising the first media unit) to a display or audio system (e.g., TV 24, display 50, or the like). For example, the user device 16 may be programmed to retrieve media unit(s) from buffer 48 and provide them to at least one port 54 so that the audio and/or video data is transmitted at a predetermined rate to the respective display, e.g., 30 frames per second.

In the block 330, user device 16 determines whether it has received a message from the local-automation system 30. The received message may include a status of control operation, a notification of a temperature exceeding a threshold, etc. For example, the message may be received from an automation device 32, e.g., via LAN 28. In some examples, the message additionally, or alternatively, may be received from sensor 36. If user device 16 determines that a message has been received from the local-automation system 30, then the process 300 proceeds to a block 340; otherwise the process 300 returns to the decision block 330 (e.g., while the block 320 occurs concurrently). It should be appreciated that outputting the audio and/or video data (e.g., the first media unit) in the block 320 is typically much longer in duration than blocks 330, 340. Further, the blocks 330, 340 could occur multiple times during the duration of the block 320. And in some examples, more media units are received prior to any message being received in block 330.

Following block 330, in the block 340, the user device 16 stores the received message in the memory 42. For example, user device 16 may be programmed to store the received message(s) in a table sorted, e.g., based on receiving times in the memory 42.

Following the blocks 320, 340, in a decision block 350, user device 16 determines whether downloading is desired or whether buffering of additional media unit(s) is warranted. For example, immediately following the presentation of the first media unit, a user may desire to download (and ultimately view) different media content. Or continuing with the example above, first media unit (block 320) and the additional media units (block 350) form part of a common media content. In this latter instance, user device 16 may be programmed to buffer one or more additional media unit(s) upon determining that a number of stored media units in the buffer 48 is less than a threshold, e.g., less than one frame. In other words, user device 16 may be programmed to start buffering the additional media unit(s) upon determining that the first media unit has been outputted already to the display and an insufficient number of media units are available in the memory 42 to maintain continuous audio and/or video data presentation. In response to user device 16 determining that the additional media unit(s) should be downloaded or buffered, process 300 proceeds concurrently to blocks 360, 370 (see FIG. 3B). However, if user device 16 determines that no additional media units should be downloaded or buffered, then the message may be outputted to the user (e.g., via any suitable display or audio system), and thereafter, the process 300 may end.

Now turning to FIG. 3B, in the block 360, which may be executed concurrently with the blocks 370, 375, user device 16 begins downloading the additional media unit(s) into memory 42 or buffering the additional media unit(s) into buffer 48 (of the memory). For example, the user device 16 may be programmed to iteratively receive media units transmitted by the content server 20 and store them in memory 42. In one example, user device 16 may be programmed to receive video frames one by one and store the received frames in the memory 42. During downloading or buffering, it is not uncommon for outputting of audio and/or video data to be interrupted—e.g., while a large file is downloaded or until processor 40 determines that buffer 48 contains a threshold quantity of audio and/or video frames.

Concurrent to (and based on) the interruption described with respect to block 360 (and the respective data downloading or buffering), user device 16 may execute block 370. In block 370, user device 16 outputs the received and stored message from the local-automation system 30. For example, user device 16 may be programmed to output the stored message as a textual and/or graphical message on TV 24, display 50, via loudspeakers within or external to device 16, etc. For example, user device 16 may be programmed to output the message to a display for any suitable time duration, e.g., 2, 4, 10, etc. seconds. In one example, the user device 16 may be programmed to output the message to a display in form of an overlay textual and/or graphical data. In the present context, an "overlay" has a transparent or semi-transparent background. As discussed above, user device 16 may be programmed to store multiple messages at memory 42, e.g., based on time of receiving each message. Additionally, or alternatively, upon determining that multiple messages are stored, user device 16 may be programmed to output each of the messages, e.g., in the order received, or based on determining a priority of the messages, etc.

An optional block 375 may follow the block 370, in which the user device 16 may receive user input in response to presenting the local-automation message. For example, user device 16 may be programmed to output a notification that the lighting system is broken, that a room temperature exceeds a specified threshold, that a mechanical issue has been detected in a building system, etc. (e.g., numerous other examples exist). User device 16 further may be programmed to receive a user instruction (e.g., to change a temperature setting, to change a timing of turning on and/or off the lights, etc.), and then, based on receiving the user instruction, user device 16 may transmit the user instruction to the local-automation system 30 which may execute the respective instruction.

Next, in a decision block 380, user device 16 determines whether downloading is complete or whether buffering of the additional media unit(s) is adequate to begin outputting the audio and/or video data of the additional media unit(s). If so, process 300 proceeds to a block 390; otherwise the process 300 returns to the decision block 380.

In the block 390, the user device 16 outputs the additional media unit(s)—e.g., providing the audio and/or video data at a port 54 (e.g., for presentation via TV 24 or external audio system) or via display 50 or via internal audio system. Following the block 390, the process 300 ends, or alternatively returns to the decision block 310 (see FIG. 3A).

Other examples of process 300 exist as well. For example, process 300 may be executed by processor 40 of the user device 16, wherein the user device 16 interacts with a package delivery server 26—e.g., instead of a local-automation system.

For example, FIG. 1 illustrates a package delivery server 26 may include a computer that is programmed to store and track a request for delivery, and the server 26 may communicate with user device 16, LAN 28, etc. via communication systems 12, 14. A request for delivery, as used herein, includes an electronic request for transporting a package containing goods from a first location to a second location, which second location comprises LAN 28, wherein the first and second locations are different. For example, the first (start) location may be a warehouse, a store, etc., and the second (destination) location may be a customer house, a business location, a store, etc. Non-limiting examples of transport include transport via air, ship, truck, car, on foot, etc. The start and/or destination locations may be specified by location coordinates such as global positioning system (GPS) coordinates. The package delivery server 26 may store a current status of the request for delivery and may be programmed to update the status based on data received from, e.g., a truck location, a package identifier device, etc. at the start and/or destination location able to read the identifier of the delivery, etc. A status may be at least one of ordered, in transit, shipping delayed, and delivered. For example, the package delivery server 26 may be programmed to change the status of the request for delivery from "in transit" to "delivered," upon receiving data from, e.g., a handheld device of delivery personnel, or a sensor at the destination location including the identifier of the package and the location coordinates of the destination location of the package. The package delivery server 26 may be programmed to transmit a message via the communication systems 12, 14 to the user device 16. The message from the package delivery server 26 may include a status update such a delivery confirmation, etc. Additionally, or alternatively, the message from the package delivery server 26 may include an update such as: (i) status changed to "delivered", (ii) delivery delayed, (iii) delivery time window confirmation, etc. Other package delivery messages are also contemplated herein.

Thus, in the context of the previously-explained process 300, the message received at block 330, stored in block 340, and outputted at block 370 may be a package delivery message from the package delivery server 26—e.g., instead of a message from the local-automation system 30. For example, the message received at block 330 may include status update, notification of delivery confirmation, a change of delivery time, etc. Further, this message may be received from the package delivery server 26 via the communication systems 12, 14 and/or via modem 22. In at least one example, the process 300 may include receiving user input based on the package delivery message (in optional block 375). For example, in response to outputting to the user a notification regarding delayed delivery, user device 16 may be programmed to receive a user input such as a cancellation of the scheduled delivery, and then, in response to receiving such input, user device 16 may be further programmed to transmit the received user input, e.g., the cancellation request, to the package delivery server 26, e.g., via the communication systems 12, 14.

Figure 4:
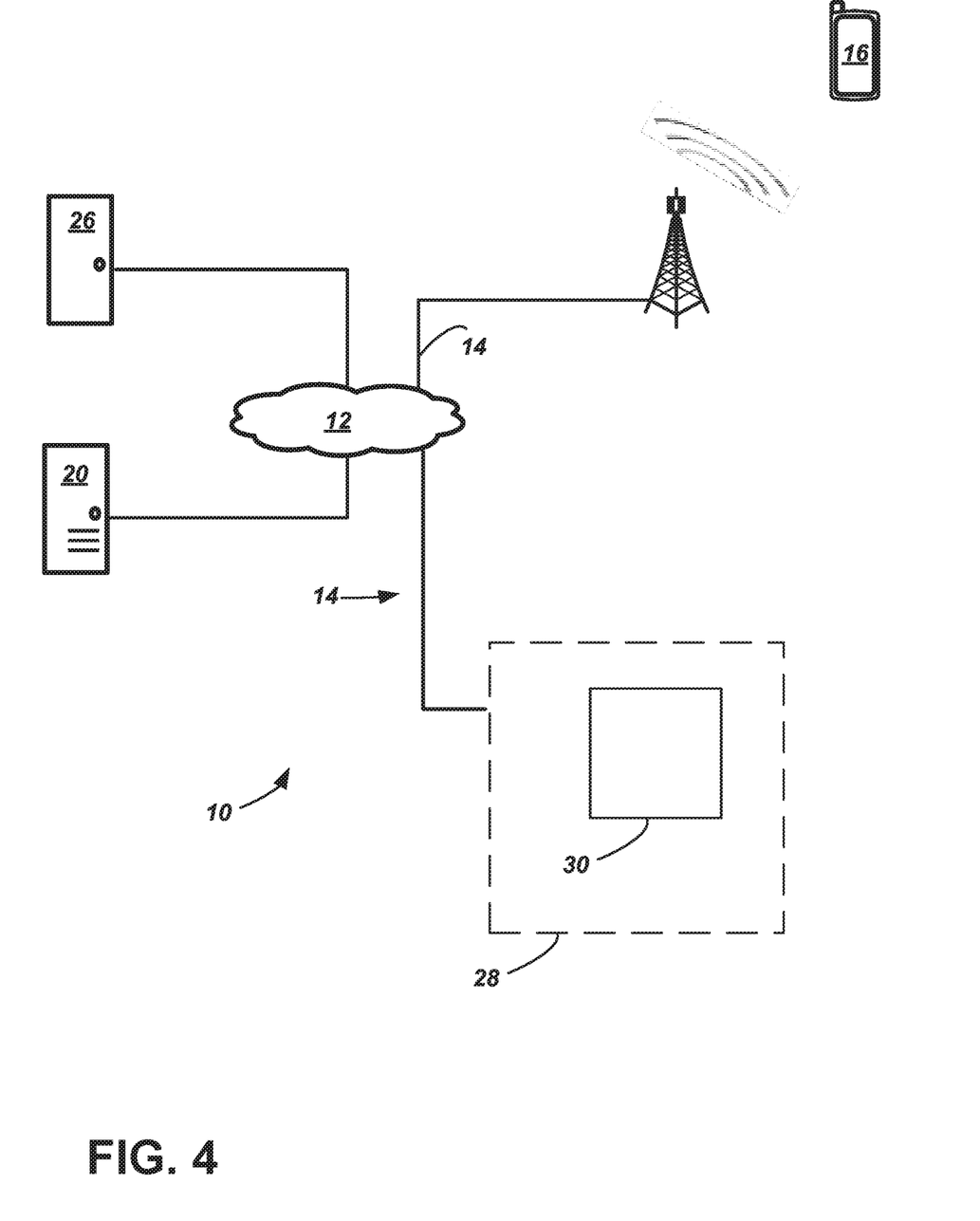
FIG. 4 shown another example of a media delivery system.

Still other examples of process 300 exist as well. For example, in at least one implementation, the user device 16 is not located within LAN 28, but may still communicate with package delivery server 26 and/or local-automation system 30 (e.g., using one or more of communication systems 12, 14). FIG. 4 is illustrative (showing device 16 outside the LAN). Note: other elements of LAN 28 (which are shown in FIG. 1) also may be present in LAN 28 (i.e., local-automation system 30 is shown in FIG. 4 by way of example only).

According to at least one example, the user of remotely-located user device 16 (e.g., implemented as a mobile device computer) may be viewing previously downloaded or streaming (e.g. buffered) media content when it receives a local-automation message or a package delivery message in block 330 (of the previously-described process 300)—e.g., being outputted to the user, via display 50 (e.g., see first media unit of block 320). For example, the local-automation message may be sent from the local-automation system 30 to the modem 22, and from the modem 22 to the remotely-located user device 16 via one or more of communication systems 12, 14. Or for example, the package delivery message may be received via cellular communication at the user device 16 and stored (block 340) until block 370. And any user input (block 370) may be transmitted from the user device 16 to the local-automation system 30 or package delivery server 26, respectively, using similar communication paths. Accordingly, user device 16 may receive and/or respond to such messages even though the device is outside of LAN 28.

It should be appreciated that only a few examples of local-automation systems were provided above. Non-limiting examples include: lighting control devices (e.g., dimmer control, on/off control, timing control, etc.), appliance control devices (e.g., water heater control, oven control, dishwasher control, etc.), security control devices (e.g., interior and/or exterior camera control, door lock control, garage door opener control, etc.), environmental control devices (e.g., heating, cooling and ventilation control (HVAC control), thermostat control, humidity control, window shade control, solar panel control, etc.), and entertainment control devices (e.g., television on/off control, parental controls, internet control, cable or satellite television control, interior and/or exterior loudspeaker control, etc.), just to name a few.

According to at least one additional example, the local-automation system 30 operates in a low power mode (e.g., also known as a power saving mode)—e.g., wherein at least one associated automation sensor 36 is deactivated during the low power mode. Referring again to FIGS. 3A-3B, according to an exemplary use-case, automation device 32 may provide the message to the user device 16 (in block 330) while sensor 36 is deactivated (and of course, while the media content is downloading or buffering). Later, in this exemplary process, when the user device 16 transmits user input to the device 32 (in block 375), then user input may cause the sensor 36 to activate (e.g., causing the system 30 to exit the low power mode). In this manner, the low power mode may persist until the user of the user device 16 is presented the message (e.g., in block 370)—thereby minimizing power consumption of the system 30.

Thus, there has been described a system for receiving a message while a user device is outputting audio and/or video data, storing that message until the user device experiences an interruption in the outputting (of the audio and/or video data) due to downloading or buffering additional media units, and based on that interruption, outputting that message from the user device during the interruption—so that the message is presented to a user.

In general, the computing systems and/or devices described may employ any of a number of computer operating systems, including, but by no means limited to, versions and/or varieties of the Microsoft® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, or the Android operating system developed by Google, Inc. and the Open Handset Alliance. Examples of computing devices include, without limitation, a computer server, a computer workstation, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method, comprising:
    downloading or buffering, from a content server to a user device, a first media unit of a plurality of media units of media content;
    displaying the first media unit via a display of the user device subsequent to the downloading or buffering the first media unit;
    concurrently with the displaying the first media unit:
        receiving a plurality of messages by the user device from a notification system separate from the content server; and
        storing the plurality of messages by the user device;
    downloading or buffering a second media unit of the plurality of media units subsequent to displaying at least a portion of the first media unit;
    displaying at least one message of the plurality of messages concurrently with the downloading or buffering the second media unit; and
    displaying the second media unit via a display of the user device subsequent to the downloading or buffering the second media unit and subsequent to displaying the at least one message.

2. The method of claim 1, wherein the user device is a set top box (STB) computer, and further comprising:
    the storing the respective message is in a memory of the STB computer;
    the downloading or buffering is executed at the STB computer; and
    the displaying the at least one message and the displaying the second media unit are via the STB computer.

3. The method of claim 1, wherein the respective message is a package delivery message, and the receiving is from a package delivery server.

4. The method of claim 1, wherein the respective message is a local-automation message, and the receiving is from a local-automation system within a local area network that also comprises the user device.

5. The method of claim 4, wherein the local-automation message is sent from a lighting control device, an appliance control device, a security control device, an environmental control device, or an entertainment control device.

6. The method of claim 1, further comprising: in response to outputting the respective message, transmitting a user instruction from the user device to a package delivery server.

7. The method of claim 1, wherein the user device is a mobile device computer, and further comprising:
    storing the respective message in a memory of the mobile device computer;
    the downloading or buffering is executed at the mobile device computer; and the displaying the at least one message and the displaying the second media unit are via the mobile device computer.

8. The method of claim 1, further comprising: in response to outputting the respective message, transmitting a user instruction from the user device to a local-automation system.

9. The method of claim 8, wherein the user instruction instructs the local-automation system to exit a low power mode.

10. The method of claim 1, wherein the user device is a mobile device computer, and further comprising:
   during the downloading or buffering of the second media unit, detecting an interruption wherein audio and/or video data is not presented via the user device; and
   the displaying the at least one message is during the interruption in response to the detecting.

11. The method of claim 1, wherein:
   the downloading or buffering the first media unit and the downloading or buffering are both to a buffer of the user device;
   the downloading or buffering the second media unit is responsive to the user device determining that the buffer does not contain at least a threshold quantity of audio and/or video frames to continue playing of the media content upon completion of displaying the first media unit, such that playing of the media content is interrupted during the downloading or buffering the second media unit; and
   the displaying the respective message is responsive to the playing of the media content being interrupted during the downloading or buffering the second media unit.

12. The method of claim 1, wherein:
   the user device performs the displaying the respective message concurrently with performing the downloading or buffering the second media unit by concurrently allocating a first portion of processing bandwidth of the user device to the displaying the respective message and a second portion of processing bandwidth of the user device to the downloading or buffering the second media unit.

\* \* \* \* \*